the geometry of the tube to be formed. The tubular mold is rotated about its longitudinal axis. The powder-binder mixture deposits on the inner wall of the tubular mold. The powder and the liquid are introduced into the tubular mold separately.

United States Patent [19]
Lydtin et al.

[11] Patent Number: 5,182,052
[45] Date of Patent: * Jan. 26, 1993

[54] METHOD OF MANUFACTURING TUBES AND DEVICE FOR CARRYING OUT THE METHOD

[75] Inventors: Hans Lydtin, Stolberg; Rolf Clasen, Aachen, both of Fed. Rep. of Germany

[73] Assignee: U.S. Philips Corp., New York, N.Y.

[*] Notice: The portion of the term of this patent subsequent to Dec. 5, 2006 has been disclaimed.

[21] Appl. No.: 702,206

[22] Filed: Feb. 15, 1985

[30] Foreign Application Priority Data
Feb. 21, 1984 [DE] Fed. Rep. of Germany ....... 3406148

[51] Int. Cl.5 .................................... B29D 11/00
[52] U.S. Cl. .................................. 264/1.2; 264/2.1; 264/311; 65/3.11; 65/18.1; 65/18.3
[58] Field of Search .................... 264/1.2, 2.1, 311; 65/18.1, 3.11, 18.3

[56] References Cited

U.S. PATENT DOCUMENTS

| | | | |
|---|---|---|---|
| 2,714,227 | 8/1955 | Graham et al. | 264/311 |
| 3,150,219 | 9/1964 | Schmidt | 264/311 |
| 3,689,614 | 9/1972 | Bortz | 264/311 |
| 4,414,164 | 11/1983 | Roba | 264/2.1 |
| 4,885,018 | 12/1989 | Bachmann | 65/18.1 |

FOREIGN PATENT DOCUMENTS 682580 11/1952 United Kingdom .
2129418 5/1984 United Kingdom .

Primary Examiner—James Derrington
Attorney, Agent, or Firm—Ernestine C. Bartlett

[57] ABSTRACT

Method of manufacturing tubes in which a mixture of powdered tube material and a liquid binder is introduced into a tubular mold with a geometry corresponding to the geometry of the tube to be formed. The tubular mold is rotated about its longitudinal axis. The powder-binder mixture deposits on the inner wall of the tubular mold. The powder and the liquid are introduced into the tubular mold separately.

40 Claims, 1 Drawing Sheet

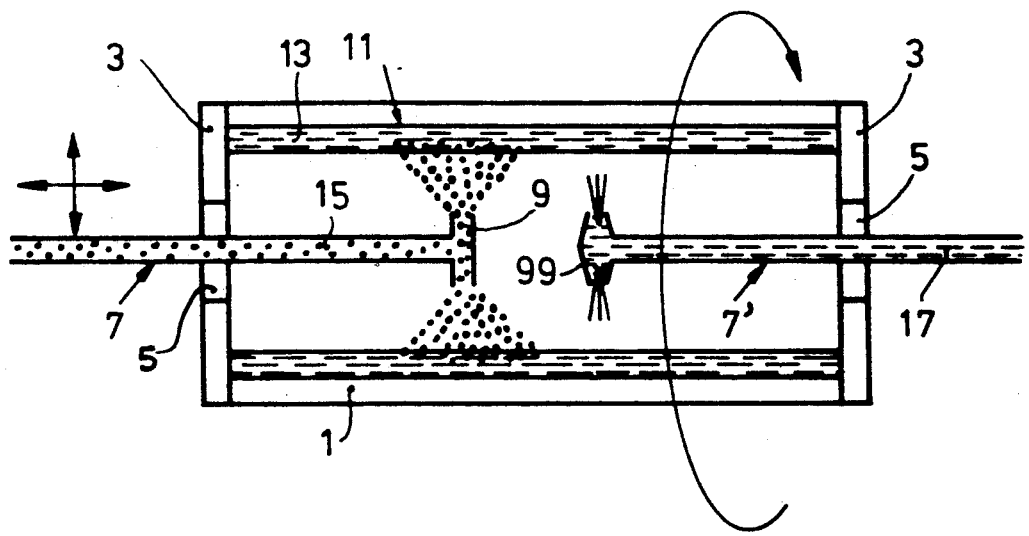

METHOD OF MANUFACTURING TUBES AND DEVICE FOR CARRYING OUT THE METHOD

BACKGROUND OF THE INVENTION

The invention relates to a method of manufacturing tubes. In the method, a mixture of a powdered tube material and a liquid binder is introduced into a tubular mold. The mold has a geometry corresponding to the geometry of the tube to be formed. The tubular mold is rotated about its longitudinal axis while the powder-binder mixture is deposited on the inner wall of the mold so that excessive binder is removed. The tubular green body is then further processed.

The invention further relates to a device for performing such a method.

A device of the kind described alone is described in British Patent 682,580. The device is used to manufacture porous glass tubes, for example to produce laboratory filters, in which the pore distribution and pore size among the sintered glass particles is as uniform as possible, and in which the pores are interconnected.

For this purpose, the powder-binder mixture is a suspension of glass powder with a grain size which is as uniform as possible. The glass powder is mixed with a binder which dispenses the solid particles, for example an aqueous glycerin solution. Wetting agents and antifoaming agents are also added. The ingredients are proportioned to provide the desired porosity, and they are provided in a centrifuge to form a loose structure of deposited solid particles on the inner wall of the mold.

Such a method is not suitable when solid particles are to be deposited on the inner wall of a tubular mold by centrifugal forces and a packing density which is as great as possible should be obtained.

A method of manufacturing glass bodies which are to be used as so-called preforms for the manufacture of optical fibers is described in German Patent 3240355 (corresponding to British Patent Application 2,129,418). This method also centrifugally deposits glass particles, but not from a suspension. Instead the particles are deposited dry on the inner wall of the tubular mold.

In this method, the dry solid particles form a loose structure and are held against the inner wall of the supporting member by centrifugal force during molding. The loose structure must then be formed into a self supporting structure by heating and/or by providing curing adhesives. The structure must then be compressed to form a fine-pored solid body, since the density obtained by molding does not satisfy the requirements for an optical fiber preform.

Disadvantages inherent to this known method are that the loose structure must be made self supporting, and that the solid body must be compressed to obtain the density required for an optical fiber preform. The compression of the solid body, in addition to requiring an additional process step, has the disadvantage that an intentional refractive index variation initially produced could be adversely altered.

Since the powders are centrifuged dry, problems of homogeneity may also occur. Due to electrostatic charges, uniform sedimentation and cohesion of the formed body is impeded. A further disadvantage may be that the loose structure exhibits nonhomogenous shrinkage behavior. This may lead to delamination of individual layers.

SUMMARY OF THE INVENTION

It is an object of the invention to provide a method of producing tubes in which the solid particles in the deposited layer have a very high packing density. In the method, layers of solid particles of different chemical compositions can be deposited in a selected manner and with a high packing density without changing the initial distribution in subsequent processing steps. It is also possible to manufacture $SiO_2$ tubes of a high density, homogeneity and purity which have sufficiently low porosity for subsequent cleaning by gases, and which can be made into quartz glass tubes of optical waveguide quality.

According to the invention these objects are achieved by separately introducing the powder and the liquid into the tubular mold.

According to a further embodiment of the invention, the binder and the powder are successively introduced into the tubular mold via dosage devices. First the liquid is deposited on the inner wall of the tubular mold.

Inherent to this embodiment is the advantage that a liquid film binder can first be deposited on the inner wall of the tubular mold.

The binder may comprise liquids of different types. For this purpose, any different liquids, for example, water, organic liquids (optionally with the addition of dispersing agents, stabilisers or the like) as known in the art for this purpose may be used.

The powdered solid phase may then be deposited on the layer of binder. By centrifugal forces the solid particles are pushed onto the liquid film where they may be wetted. The fine particles may then become coated with a dispersing agent and be protected from premature coagulation.

In the liquid film, the solid particles now drift separated from each other to the inner wall of the tubular mold. At the inner wall, the solid particles are deposited with great packing density (50 to 90% of the theoretical packing density). The intermediate spaces remain filled with the liquid (which may comprise a dispersing agent and a binder).

In order to facilitate a uniform deposition of the solid particles in the axial direction on the tubular mold, the powder supply may be moved continuously in the axial direction. In order to deposit powder as fast as possible, the liquid may also be supplied continuously via separate inlets and be proportioned so that the deposited solid particle layer is always covered with a thin liquid film.

The advantages of this method are that the duration of the process can be considerably reduced as compared with a one-time supply of the required quantity of liquid since the deposition time is proportional to the viscosity of the liquid and the film thickness. Separation of solid particles of different densities and dimensions is also minimized by this measure.

The tubular mold to be coated on its inside may be rotatable about its longitudinal axis in a horizontal and-/or in a vertical position.

According to a further embodiment of the invention the binder and the solid are simultaneously introduced into the tubular mold via the dosing devices. Excessive liquid is sucked off during the process.

The present invention is advantageous because at any stage of the process only a very thin liquid film (1 mm, preferably 10 to 100 μm) is present over already deposited solid particles. This reduces the sedimentation time.

According to this method, tubes can be produced with any desired structure (e.g. preforms for single modes or gradient fibers).

In this connection, it is important that the green tubes which are subsequently sintered to transparent glass should have a very uniform grain distribution in the axial and radial directions. In this manner, shrinkage cracks can be reduced during drying of the green bodies consisting of submicroscopic particles.

Since commercially available solid particle starting materials for the manufacture of optical waveguides usually have wide grain distributions (for example, grain diameters from 5 to 500 nm), it is necessary first to separate the starting powder into narrower grain size ranges. This may be done, for example, by stirring 1200 g of a commercially available starting material (highly dispersed $SiO_2$ powder) in 2000 cm$^3$ of aqueous concentrated ammonia solution. The powder is ultrasonically dispersed for 30 minutes. Such a suspension is then centrifuged (e.g. in a large laboratory centrifuge for 30 minutes at $2.2 \times g$), the clear solution is decanted, and the sedimented bodies are dried at 120° C. for one hour. The powder is then separated into fine, medium and coarse powder by dividing the sedimented body into three parts according to the deposited grain fractions. Every third part of the original sedimented body may now be used successfully as a starting material for the manufacture of a green body according o the method of the invention.

According to another embodiment of the method according to the invention, a lubricant film is provided on the inner wall of the tubular mold prior to providing powder and binder for better release of the green body from the mold. The lubricant film may preferably consist of high molecular weight hydrocarbons, for example paraffins. For example, a paraffin having a melting point from 46° to 50° C. can be used. The green body sedimented on the inner wall of the tubular mold can then be easily removed from the mold by a slight heating of the tubular mold, for example, with a hot air fan or by dipping in hot water.

According to a further embodiment of the invention, the binder is single-phase or a multiphase mixture. The binder may also be an inorganic/organic solution, an organic substance, or a hydrophobic liquid.

A hydrophobic liquid is, for example, a paraffin which is fluid at room temperature. Contrary to expectations, solid particles are transported in this binder. It is presumed that the OH-groups absorbed on the surface of, for example, $SiO_2$ solid particles stabilitize the solid particles by bridge formation.

After the sedimentation of the solid particles, removal from the mold can be easily achieved by heating the tubular mold to approximately 100° to 150° C.

According to another embodiment of the method according to the invention, the binder may be UV curing polymers which are fluid at room temperature.

According to further advantageous embodiments of the invention, the powder is a material which is suitable for optical waveguides. In particular, the powder may be highly dispersed $SiO_2$ powder with a grain size in the range from 5 to 500 nm, preferably from 10 to 200 nm. The powder may be without or with dopants suitable for obtaining a desired refractive index. The doping may be obtained, for example, by adding $GeO_2$ powder.

In another embodiment of the invention, the ceramic powder for example for the manufacture of optical waveguides, is introduced into the mold successive batches of different chemical compositions.

In particular, the powder is introduced in such manner that layers of different compositions deposit on the inner wall of the tubular mold according to a desired refractive index profile. By the addition of differently powders and by varying their ratios over the time, any desired distribution can be constructed across the wall thickness. For manufacturing optical waveguides, the defined change of the refractive index over the radius is of great importance.

By using several dosing devices, it is possible to introduce different solid particle flows into the inside of the tubular mold. For example, a pure $SiO_2$ powder and a $SiO_2$ powder doped with $GeO_2$ can be introduced to build up selected refractive index profiles in the deposited green body.

In the method according to the invention, the solid phase may also be manufactured in a chemical process in the gaseous phase immediately before it is deposited on the inner wall of the tubular mold. Gaseous starting substances are heated in the mold or immediately before entering the mold. The gases are reacted to form the powders. The gaseous phase acts as a dispersing agent for the resulting solid phase.

$SiH_4$ and $O_2$ are advantageously used as gaseous starting substances. However, for example, the halides of silicon are also known for such processes to those skilled in the art.

The solid particles forming during the progress of the process immediately get in the acceleration field of the centrifuge and sediment on the inner wall of the tubular mold. An advantage of this "in situ" process is the exact dosability of the solid particles and their substantially ideal dispersion in the gaseous phase. The disadvantage of a convective gas flow can be compensated for by this.

A device for performing the method according to the invention has a tubular mold which can be driven as a centrifuge. The mold can be closed by two apertured diaphragms arranged at right angles to the longitudinal axis of the tubular mold. Through the apertures of the diaphragms, a tubular dosing device can be moved along the longitudinal axis of the tubular mold in such manner that a part of the tube remains outside the mold. The dosing device can be charged at one end with materials to be provided on the inside of the tubular mold. The other end of the dosing device extends inside the mold and has at least one outlet (nozzle) through which material can be injected inside the mold and can be deposited by centrifugal forces o the inner wall of the mold.

According to a further embodiment of the device according to the invention, the mold is a tube whose ends can be closed by diaphragms. The centrifugal drive is a motor whose shaft is connected to the mold or whose rotor is itself the mold.

BRIEF DESCRIPTION OF THE DRAWING

The drawing schematically shows a centrifugal mold for manufacturing tubes according to the invention.

DESCRIPTION OF THE PREFERRED EMBODIMENTS

A horizontally (or vertically) arranged tube (mold 1) has end faces which are partly closed by removable diaphragms 3. The sizes of apertures 5 in diaphragms 3 are adjustable.

A fluid 17 is provided in mold 1 and is distributed uniformly by centrifuging to form a fluid film 13 on the inner wall 11 of the mold 1. Powdered starting material 15 is then applied to the inside of the mold 1 via a dosing device (pipe 7). Tube 7 has outlet apertures 9 which can be moved axially and radially.

The solid particles are pushed onto the fluid film 13 by centrifugal forces. The particles may be wet by the fluid film 13, and the fine particles are coated with dispersing agent and are safeguarded from a premature coagulation. The solid particles now drift separated from each other in the fluid film 13 in the direction of the inner wall 11 of the mold 1. The solid particles are deposited on the inner wall with great packing density (50 to 90% of the theoretical packing density).

The intermediate spaces between the solid particles remain filled with the fluid. The fluid may, for example, comprise a dispersing agent and a binder.

In order to uniformly deposit the solid particles along the length of the mold 1, the solid particles may be supplied while tube 7 is continuously shifted in the axial direction. In order to deposit particles as fast as possible, the liquid 17 may also be supplied continuously via a separate dosing device (a second pipe 7') through a nozzle 19. The liquid supply may be proportioned so that the deposited layer of solid particles is always coated with only a thin fluid film.

The following advantages are obtained by this method. The duration of the process can be considerably reduced as compared with a one-time supply of the required fluid since the deposition time is proportional to the viscosity of the liquid and the film thickness. Separation of solid particles of different densities and dimensions is minimized due to faster deposition. The mold can be rotated about its longitudinal axis either horizontally or vertically.

A few embodiments for manufacturing $SiO_2$ tubes of high density, homogeneity and purity will be described below.

EXAMPLE 1

Approximately 120 ml of a 15% polyvinyl alcohol solution (degree of polymerization 350) are provided in a rotating high-strength metal tube, for example steel or aluminum. The tube has an overall length of 160 mm and an outside diameter of 60 mm. The end faces of the tube are provided with removable diaphragms. Each diaphragm has a thickness of 5 mm.

The metal tube is first rotated at a frequency of 1,000 rpm. After the liquid is uniformly distributed over the inner wall of the tube, 210 g of finely divided, highly-dispersed $SiO_2$ powder is injected inside the tube. The powder is distributed via an axially movable dosing device at a dosing rate of 1 g/min. The powder is distributed uniformly by reciprocating the dosing device at a rate of 5 m/min, while simultaneously increasing the rotation of the tube to 30,000 rpm.

After completed sedimentation of the solid particles by the centrifugal acceleration (which in this case is approximately 20,000 times larger than the acceleration due to gravity), the excess liquid film present over the deposit is sucked off. The deposited green body is then removed from the mold by a slight heating of the substrate tube, for example to 50° to 100° C. In order to facilitate removal of the green body from the mold, it is recommended to provide a thin layer of a lubricating film, for example paraffin, on the inner wall of the tube at the beginning of the process.

The green body obtained in this manner has a highly accurate geometry and a density which is substantially uniform. After drying at 120° C. and removing the binder by slowly heating to 500° C. (at a heating rate of 150° C./h) a green body with small pores is obtained. Such a green body can then be cleaned by chlorination and can be sintered to form a quartz glass tube.

Contaminants may be, for example, $H_2O$ or certain metal compounds. Such contaminants removed at 800° C. in an OH2Y-flow saturated at room temperature with $SOCl_2$ at a flow rate of 1 to 2 l/min. The contaminants are chlorinated and escape as a volatile phase.

The sintering of the slightly porous green body to form a dense transparent bubble-free glass occurred at 1500° C. at a lowering rate into a furnace of 3 mm/min in a helium/chlorine atmosphere. The atmosphere had a pressure of $10^5$ Pa and a flow rate of 1 l/min. According to this method a transparent quartz glass tube of high surface quality was obtained in a high purity.

EXAMPLE 2

$SiO_2$/binder green bodies can be manufactured faster than in Example 1 by continuously supplying liquid while the powder is supplied so that only a thin liquid film (1 mm, preferably 10 to 100 $\mu$m) is present above the previously deposited solid particles. By this method, it is possible to increase the speed powder injection to 5 g/min without any problems, and moreover to reduce separation of solid particles of different sizes during the short sedimentation time.

EXAMPLE 3

Green bodies with radially varying compositions can be manufactured as follows:

First, the liquid described in Example 1 is provided in the tubular mold. By supplying different starting powders (solid particles) and by varying their ratios over time, substantially any radial composition variation may be obtained.

For manufacturing optical waveguides, the selected change of the refractive index over the radius is of great importance. By providing, for example, a second dosing device (in the form of a second tube which can also be moved axially), a second powder can be accurately deposited. For example, 15% by weight of $GEO_2$-containing $SiO_2$ powder can be provided inside the rotating tubular mold simultaneously with pure $SiO_2$ powder. At the beginning of the process, only pure $SiO_2$ powder is supplied at a dose rate of 1 g/min. During the process, while keeping the total dosing rate of 1 g/min constant, the dosing of the pure $SiO_2$ powder is linearly reduced to zero while the dosing rate of the $SiO_2$—$GeO_2$ powder is simultaneously and equally increased.

After the necessary intermediate steps of heating, cleaning, sintering, collapsing and drawing, gradient index fibers with attenuations of less than 1 dB/km at 1300 nm can be manufactured in this manner.

EXAMPLE 4

Tubes can be manufactured by centrifuging a powdered starting material in a hydrophobic liquid as follows. The process described in Examples 1 to 3 is performed with liquid paraffin instead of aqueous polyvinyl alcohol.

After sedimentation of the green body, the body may be removed from the mold by heating the mold to approximately 100° to 150° C.

Instead of a hydrophobic liquid as a binder, thermoplastic or duroplastic synthetic resins can be used advantageously as a dispersing matrix and a binder. The use of U.V.-curing lacquers which are liquid at room temperature and cure only by U.V.-radiation has also proved to be of interest.

EXAMPLE 5

Solid particles can be manufactured and deposited in a single process step (with subsequent centrifuging) as follows. First, a liquid as described in Example 1 is provided in the tubular mold.

The starting materials for manufacturing the powder are gaseous substances, for example $SH_4$ and $O_2$. They are injected inside the rotating tubular mold via an axially movable ring burner. The gases are reacted in burner nozzles which are cylindrically symmetric on the ring. The ring has a radius r, where $r > r_o$ and $r < r_i$ ($r_o$ = the radius of the shaft of the rotating cylindrical tube, $r_i$ = inner radius of the cylindrical shell mold). The result is that solid particles are formed immediately behind the burner nozzles and are injected into the accelerating field of the centrifuge. The particles sediment in the direction of the inner wall of the tubular mold.

An advantage of this in situ process is the accurate dosability of the materials and their substantially ideal dispersing in the gaseous phase.

The following process parameters were used: gas flows: $SiH_4 = 165$ cm$^3$/min; $O_2 = 650$ cm$^3$/min; These values relate to a pressure of $10.11 \times 10^4$ Pa. Rotation speed of the tubular mold: 150 rpm; Deposition duration: 6 hours; Deposited $SiO_2$ solid particles mass: 180 g.

The examples described relate to the manufacture of high purity or doped quartz glass tubes. According to the present method and the present device, however, tubes of any other materials, for example of aluminum oxide or iron, can also be manufactured.

High purity and geometrically accurate quartz tubes as manufactured according to the present process can be used in the manufacture of optical waveguides, or also in the manufacture of halogen and gas discharge lamps.

What is claimed is:

1. A method of manufacturing a tube, said method comprising the steps of:
    providing a tubular mold having an inner wall and a longitudinal axis;
    rotating the mold about its longitudinal axis;
    introducing a liquid binder into the tubular mold, said liquid binder being deposited on the inner wall of the rotating mold;
    introducing a powdered material into the tubular mold after the liquid binder is introduced, said powder being deposited in the liquid binder on the inner wall of the rotating mold; and
    removing excess liquid binder from the mixture of binder and powder to form a green tubular body;
    characterized in that the method further comprises the steps of:
    successively and alternately introducing a second amount of liquid binder and powder into the tubular mold, said liquid binder and powder being deposited on the previously deposited mixture of binder and powder.

2. A method as claimed in claim 1, characterized in that:
    the liquid binder is introduced into the mold by way of a first pipe having an outlet aperture in the mold, said pipe being movable axially and radially in the mold; and
    the powder is introduced into the mold by way of a second pipe having an outlet aperture in the mold, said second pipe being movable axially and radially in the mold.

3. A method as claimed in claim 2, characterized in that the method further comprises the step of moving the pipes relatives to the mold during introduction of the powder and liquid binder.

4. A method as claimed in claim 1, characterized in that the method further comprises the step of providing a lubricating film on the inner wall of the mold before introducing the liquid binder or powder.

5. A method as claimed in claim 4, characterized in that the lubricating film is a high molecular weight hydrocarbon.

6. A method as claimed in claim 1, characterized in that the binder is multiphase.

7. A method as claimed in claim 1, characterized in that the binder is a hydrophobic fluid.

8. A method as claimed in claim 7, characterized in that the binder is paraffin which is liquid at room temperature.

9. A method as claimed in claim 1, characterized in that the powder is a ceramic material.

10. A method as claimed in claim 9, characterized in that the ceramic powder is suitable for making optical waveguides.

11. A method as claimed in claim 4, characterized in that the powder is highly dispersed $SiO_2$ with a grain size from 4 to 500 nanometers.

12. A method as claimed in claim 11, characterized in that the powder further comprises $GeO_2$.

13. A method as claimed in claim 9, characterized in that the ceramic powder is $Al_2O_3$.

14. A method as claimed in claim 1, characterized in that the powder is manufactured by a chemical reaction in the gaseous phase.

15. A method as claimed in claim 14, characterized in that the powder is manufactured immediately prior to its deposition.

16. A method as claimed in claim 15, characterized in that the powder is manufactured by reacting $SiH_4$ and $O_2$.

17. A method as claimed in claim 15, characterized in that the reaction is promoted by a heating means which is axially movable along the mold.

18. A method as claimed in claim 1, characterized in that the powder is introduced into the mold in successive batches with different chemical compositions.

19. A method as claimed in claim 18, characterized in that the batches produce layers with different refractive indices.

20. A method of manufacturing a tube, said method comprising the steps of:
    providing a tubular mold having an inner wall and a longitudinal axis;
    rotating the mold about its longitudinal axis;
    introducing a liquid binder into the tubular mold, said liquid binder being deposited on the inner wall of the rotating mold;
    introducing a powdered material into the tubular mold simultaneously with the liquid binder, said powder being deposited in the liquid binder on the inner wall of the rotating mold; and removing excess liquid binder from the mixture of binder and powder to form a green tubular body;

characterized in that the method further comprises the steps of:

successively and simultaneously introducing a second amount of liquid binder and powdered material into the tubular mold, said liquid binder and powdered material being deposited on the previously deposited mixture of binder and powder.

21. A method of manufacturing a tube, said method comprising the steps of:

providing a tubular mold having an inner wall and a longitudinal axis;

providing supply means for introducing powdered material into the mold;

providing supply means for introducing liquid binder into the tubular mold;

rotating the mold about its longitudinal axis;

introducing a liquid binder into the tubular mold, said liquid binder being deposited on the inner wall of the rotating mold;

separately introducing a powdered material into the tubular mold, said powder being deposited on the inner wall of the rotating mold; and removing excess liquid binder from the mixture of binder and powder to form a green tubular body;

wherein the method further comprises the steps of:

successively introducing an additional amount of liquid binder into the tubular mold, said liquid binder being deposited on the previously deposited mixture of binder and powder; and separately introducing an additional amount of powdered material into the tubular mold by continuously moving said powder supply means relative to the inner surface of the tubular mold, said additional amount of powder being successively deposited on the previously deposited mixture of binder and powder.

22. A method of manufacturing a tube, said method comprising the steps of:

providing a tubular mold having an inner wall and a longitudinal axis;

providing supply means for introducing a powdered material into the mold;

providing supply means for introducing liquid binder into said tubular mold;

rotating the mold about its longitudinal axis;

introducing a liquid binder into the tubular mold, said liquid binder being deposited on the inner wall of the rotating mold;

introducing a powdered material into the tubular mold after the liquid binder is introduced, said powder being deposited on the liquid binder on the inner wall of the rotating mold; and removing excess liquid binder from the mixture of binder and powder to form a green tubular body;

wherein the method further comprises the steps of:

introducing an additional amount of liquid binder into the tubular mold by continuously moving said liquid supply means relative to the inner surface of the tubular mold, said liquid binder being deposited on the previously deposited mixture of binder and powder; and introducing an additional amount of powder into the tubular mold after the additional amount of liquid binder is introduced by continuously moving the powder supply means relative to the inner surface of the tubular mold; said additional amount of powder being deposited on the liquid binder on the inner wall of the rotating mold.

23. A method of manufacturing a tube, said method comprising the steps of:

providing a tubular mold having an inner wall and a longitudinal axis;

providing supply means for introducing powdered material and a liquid binder, respectively and successively into said tubular mold;

rotating the mold about its longitudinal axis;

introducing a liquid binder into the tubular mold, said liquid binder being deposited on the inner wall of the rotating mold;

introducing a powdered material into the tubular mold simultaneously with the liquid binder, said powder being deposited on the liquid binder on the inner wall of the rotating mold; and removing excess liquid binder from the mixture of binder and powder to form a green tubular body;

wherein the method further comprises the steps of:

introducing an additional amount of liquid binder into the tubular mold, said liquid binder being deposited on the previously deposited mixture of binder and powder; and introducing an additional amount of powdered material into the tubular mold simultaneously with the second amount of liquid binder by continuously moving said respective supply means relative to the inner surface of the tubular mold, said additional amount of powder being deposited in the liquid binder on the previously deposited mixture of binder and powder.

24. A method of manufacturing a tube, said method comprising the steps of:

providing a tubular mold having an inner wall and a longitudinal axis;

providing supply means for introducing a solid phase material and a liquid material, respectively, into the tubular mold;

rotating the mold about its longitudinal axis;

introducing a liquid phase material into the tubular mold, said liquid phase material being deposited on the inner wall of the rotating mold;

separately introducing a solid phase material into the tubular mold, said solid phase material being deposited on the inner wall of the rotating mold; and removing excess liquid phase material from the mixture of solid phase material and liquid phase material to form a green tubular body;

wherein the method further comprises the steps of successively introducing said solid phase material and said liquid phase material into the tubular mold by continuously moving the supply means relative to the inner surface of the mold.

25. A method as defined in claim 24, wherein the liquid material is introduced into the mold by way of a first pipe having an outlet aperture in the mold, said pipe being movable axially and radially in the mold; and the solid material is introduced into the mold by way of a second pipe having an outlet aperture in the mold, said second pipe being movable axially and radially in the mold.

26. A method as claimed in claim 20, wherein the method further comprises the step of providing a lubricating film on the inner wall of the mold before introducing the liquid phase material or solid phase material.

27. A method as claimed in claim 26, wherein the lubricating film is a high molecular weight hydrocarbon.

28. A method as claimed in claim 24, wherein the liquid phase material is hydrophobic fluid.

29. A method as claimed in claim 28, wherein the liquid phase material is paraffin which is liquid at room temperature.

30. A method as claimed in claim 24, wherein the solid phase material is a ceramic powder material.

31. A method as claimed in claim 30, wherein the ceramic powder is suitable for making optical wavelengths.

32. A method as claimed in claim 31, wherein the powder is highly dispersed $SiO_2$ with a grain size from 4 to 500 nanometers.

33. A method as claimed in claim 32, wherein the powder further comprises $GeO_2$.

34. A method as claimed in claim 30, wherein the ceramic powder is $Al_2O_3$.

35. A method as claimed in claim 24, wherein the solid phase material is a powder manufactured by a chemical reaction in the gaseous phase.

36. A method as claimed in claim 35, wherein the powder is manufactured immediately prior to its deposition.

37. A method as claimed in claim 36, wherein the powder is manufactured by reacting $SiH_4$ and $O_2$.

38. A method as claimed in claim 36, wherein the reaction is promoted by a heating means which is axially movable along the mold.

39. A method as claimed in claim 30, wherein the powder is introduced into the mold in successive batches with different chemical compositions.

40. A method as claimed in claim 39, wherein the batches produce layers with different refractive indices.

* * * * *